United States Patent
Surlaker et al.

(10) Patent No.: US 7,178,153 B1
(45) Date of Patent: Feb. 13, 2007

(54) METHOD AND MECHANISM FOR IMPLEMENTING AN ACCESS INTERFACE INFRASTRUCTURE

(75) Inventors: Kapil Surlaker, Mountain View, CA (US); Sreenivas Gollapudi, Cupertino, CA (US); Lakshminarayanan Chidambaran, Fremont, CA (US); Debashis Saha, Foster City, CA (US)

(73) Assignee: Oracle International Corporation, Redwood Shores, CA (US)

( * ) Notice: Subject to any disclaimer, the term of this patent is extended or adjusted under 35 U.S.C. 154(b) by 548 days.

(21) Appl. No.: 10/144,688

(22) Filed: May 10, 2002

(51) Int. Cl.
*G06F 13/00* (2006.01)

(52) U.S. Cl. .............. 719/328; 719/310; 719/321; 707/1; 707/100

(58) Field of Classification Search ............ 707/1, 707/10, 6, 102; 719/310, 313, 321, 311, 719/320, 328
See application file for complete search history.

(56) References Cited

U.S. PATENT DOCUMENTS

| | | |
|---|---|---|
| 4,736,321 A | 4/1988 | Brown et al. |
| 4,949,255 A | 8/1990 | Gerth et al. |
| 5,218,697 A | 6/1993 | Chung |
| 5,257,366 A | 10/1993 | Adair et al. |
| 5,416,917 A | 5/1995 | Adair et al. |
| 5,420,540 A | 5/1995 | Butler |
| 5,452,450 A | 9/1995 | Delory |
| 5,455,948 A | 10/1995 | Poole et al. |
| 5,524,253 A | 6/1996 | Pham et al. |
| 5,539,886 A | 7/1996 | Aldred et al. |
| 5,542,078 A | 7/1996 | Martel et al. |
| 5,596,744 A | 1/1997 | Dao et al. |
| 5,608,874 A | 3/1997 | Ogawa et al. |
| 5,617,533 A | 4/1997 | Wu et al. |
| 5,627,972 A | 5/1997 | Shear |
| 5,651,111 A | 7/1997 | McKeeman et al. |
| 5,655,116 A | 8/1997 | Kirk et al. |
| 5,680,618 A | 10/1997 | Freund |
| 5,682,535 A | 10/1997 | Knudsen |
| 5,706,499 A | 1/1998 | Kleewein et al. |
| 5,710,918 A | 1/1998 | Lagarde et al. |
| 5,713,014 A | 1/1998 | Durflinger et al. |
| 5,714,906 A | 2/1998 | Motamed et al. |
| 5,721,904 A | 2/1998 | Ito et al. |
| 5,745,754 A | 4/1998 | Lagarde et al. |
| 5,764,949 A | 6/1998 | Huang et al. |
| 5,768,577 A | 6/1998 | Kleewein et al. |
| 5,768,589 A | 6/1998 | Bradley et al. |
| 5,787,452 A | 7/1998 | McKenna |
| 5,794,234 A | 8/1998 | Church et al. |
| 5,806,066 A | 9/1998 | Golshani et al. |
| 5,859,972 A | 1/1999 | Subramaniam et al. |

(Continued)

FOREIGN PATENT DOCUMENTS

EP    1 075 086 A1    2/2001

*Primary Examiner*—William Thomson
*Assistant Examiner*—Andy Ho
(74) *Attorney, Agent, or Firm*—Bingham McCutchen LLP (57) ABSTRACT

A method and system for implementing an improved access interface infrastructure is disclosed. In one approach, an access interface methods is directly supported by an application. The directly supported access interface method corresponds to an access interface implementation. Other access interface methods are transparently processed by being converted or mapped into a generic interface format, which is then translated into the directly supported format.

28 Claims, 4 Drawing Sheets

U.S. PATENT DOCUMENTS

| | | |
|---|---|---|
| 5,987,463 A | 11/1999 | Draaijer et al. |
| 6,041,344 A | 3/2000 | Bodamer et al. |
| 6,049,800 A | 4/2000 | Govindarajan et al. |
| 6,226,649 B1 | 5/2001 | Bodamer et al. |
| 6,236,997 B1 | 5/2001 | Bodamer et al. |
| 6,457,042 B1 * | 9/2002 | Czaykowski et al. ....... 709/203 |
| 6,523,042 B2 * | 2/2003 | Milleker et al. ............ 707/102 |
| 6,546,396 B1 * | 4/2003 | Borkowski et al. ......... 707/102 |
| 6,654,747 B1 * | 11/2003 | Van Huben et al. .......... 707/10 |
| 6,810,521 B1 * | 10/2004 | Gelgon et al. .............. 719/313 |
| 6,820,266 B1 * | 11/2004 | Minakawa et al. ......... 719/313 |
| 6,873,980 B2 * | 3/2005 | Young et al. .................. 707/1 |
| 2002/0017931 A1 | 2/2002 | Kadanka et al. |

* cited by examiner

METHOD AND MECHANISM FOR IMPLEMENTING AN ACCESS INTERFACE INFRASTRUCTURE

BACKGROUND AND SUMMARY

The invention relates to computing systems, and more particularly to a method and mechanism for implementing an access interface infrastructure. An access interface is a mechanism that implements access to a computing system. In a database context, an access interface provides a given entity with access to use and implement database functionality.

Figure 1:
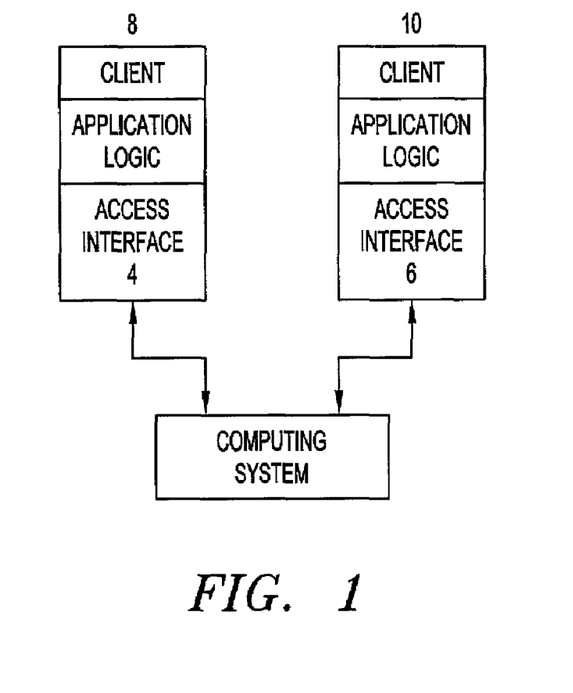
FIG. 1 depicts an architecture for directly implementing multiple access interfaces to a computing application.

FIG. 1 shows one approach for implementing access interfaces in a computing system. In the architecture of FIG. 1, a computing system, e.g., an database management system, is available to be accessed and used by one or more external entities, e.g., client nodes 8 and 10. Each client node 8 and 10 employs a different access interface standard to communicate with the computing system. Support for multiple access interface standards at the computing system is provided by directly creating separate and distinct interface implementations for each access interface that is to be used. The interface implementation contains an entire application stack having sufficient content to allow direct functional interaction between the computing system and its corresponding access interface standard. Thus, a first access interface implementation 4 would be created and supported for the first access interface standard used by client node 8 and an entirely separate access interface implementation 6 would be created and supported for the second access interface standard used by client node 10.

One significant drawback with this approach is that the client application needs to be rewritten with different access interfaces for different computing environments. This type of modification for the client application is a non-trivial task that is both costly and time-consuming. However, unless this process is performed, clients may not be able to functionally communicate with other computing systems.

Moreover, this approach is subject to significant inefficiencies when performing maintenance updates, since any updates may necessarily need to be implemented and repeated for each and every interface implementation in the system. This multiplies the amount of work that is needed to update the system, even for a simple bug fix. In addition, modifying so many different components greatly increases the possibility of introducing unforeseen errors into the system.

The present invention is directed to a method and system for implementing an infrastructure to support an access interface that address these and other problems. In an embodiment, a specific access interface is directly supported by an application. The directly supported access interface method corresponds to an access interface implementation. Other access interface methods are transparently processed by being converted into a generic interface format, which is then translated into the directly supported format. Further details of aspects, objects, and advantages of the invention are described below in the detailed description, drawings, and claims.

BRIEF DESCRIPTION OF THE DRAWINGS

The accompanying drawings are included to provide a further understanding of the invention and, together with the Detailed Description, serve to explain the principles of the invention.

DETAILED DESCRIPTION

The present invention relates to a method and system for implementing an access interface infrastructure. As noted above, an access interface is a mechanism that implements access to a computing system. In a database context, an access interface provides a given entity with access to use and implement database functionality. There are no specific limitations upon the types of access methods, functionalities, or access interfaces that may be employed in conjunction with the present invention. For example, the access methods, functionalities, or access interfaces usable with embodiments of the invention may comprise a specific language, language interface, API, or call interface.

It is helpful at this point to describe examples of functionality that can be used with an access interface. A first example of such functionality involves functionality supported by standardized call/programming interfaces. For instance, the Oracle Call Interface ("OCI") provides a mechanism to access functionality in database products available from Oracle Corporation of Redwood Shores, Calif.

Additional functionality examples may relate to mechanisms for allowing foreign database products to interact with and functionally use a native database product or server. An example of this type of functionality is provided by the HO ("Heterogeneous Option") mechanism, available from Oracle Corporation, which allows access to a native database from non-native software products.

Figure 2:
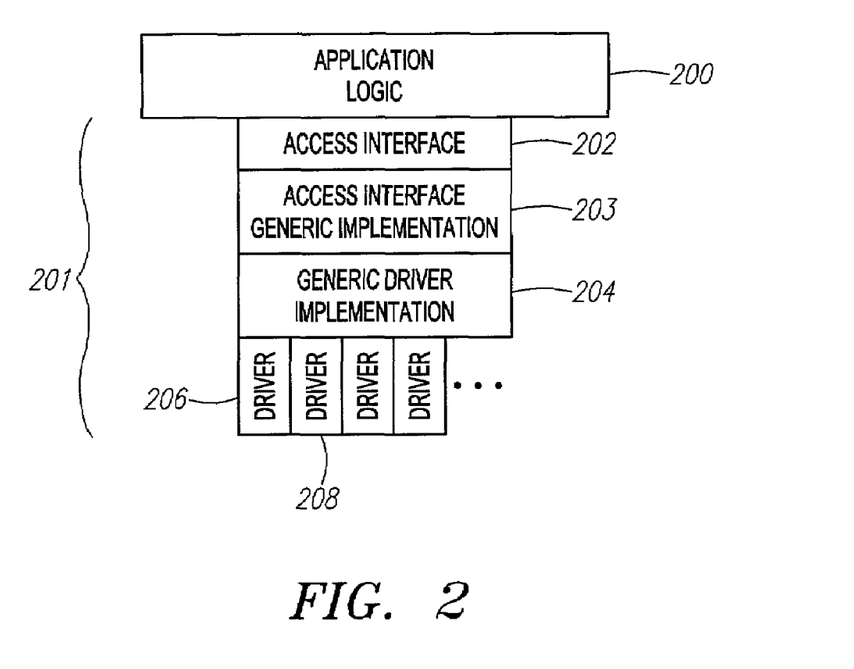
FIG. 2 shows an architecture for implementing an access interface according to an embodiment of the invention.

FIG. 2 shows an architecture for supporting an access interface according to an embodiment of the invention. In FIG. 2, notice that each and every access interface that is expected to interact with the application logic 200 does not have its own separate application stack allowing direct functional access (which was the approach taken in FIG. 1). Instead, support is provided to allow direct support for only a limited number of access interface methods.

In an embodiment, direct support is provided for only a single access interface to application logic 200, e.g., the OCI access interface. The directly supported access interface corresponds to a specific access interface implementation layer 202, which contains an entire application stack having sufficient content to allow direct functional interaction between the computing application and its corresponding access interface standard. If only a single access interface is directly supported, only one access interface implementation layer 202 is associated with the application logic 200. In one embodiment, the access interface implementation layer 202 comprises similar logic and structure to the access implementation 4 or 6 from FIG. 1, and employs a specific format for using and communicating with the access interface implementation layer 202.

The access interface implementation layer 202 communicates with an access interface generic implementation layer 203, which in turn communicates with a generic driver implementation layer 204. The generic driver implementation layer 204 is configured to utilize access information in a generic interface format. In one embodiment, the generic interface format is independent of any particular access method, but should be able to map to functionality that corresponds to a suitably usable portion of the functionality of any specific interface formats used at the specific access interface implementation layer 202. The generic driver implementation layer 204 comprises higher-level data structures that is used to capture information for implementing functionality at the application 200. In an embodiment, the generic driver implementation layer 204 takes the form of a driver function table in which each function corresponds to a functionality that the generic implementation for access interface needs to support. For a database application, the generic driver implementation layer 204 supports mappings for functionality useful for database applications, e.g., pertaining to SQL-related processing, bind data, and database configurations.

The access interface generic implementation layer 203 provides a mapping between functionality specified in the generic driver format supported by the generic driver implementation layer and the specific access formats required by the access interface layer 202.

A separate driver 206 or 208 exists for each discrete set of functionality that is expected to be employed with the application logic 200 through the access interface layer 202. Each driver 206 or 208 provides a mapping between a discrete set of functionality relevant to that driver and the generic driver format supported by the generic driver implementation layer 204. In addition, a driver may be used to provide mappings between other access interface formats and the generic driver format. Thus, other call interface formats may have dedicated drivers that allow a suitable mapping between the generic driver format and the relevant access interface formats.

Some examples of functionality that may be supported in the present access interface architecture include:

Connection functionality to handle connection specific attributes and logic such as connection establishment and asynchronous or synchronous read/writes, etc.

Metadata-related functionality, such as functionality to handle retrieval and maintenance of metadata information for database schema objects.

Mapping and Unmapping functionality to support mapping and unmapping of various objects and elements in a systems, such as mapping virtual connections/sessions to physical connections/sessions.

Signal handling functionality to handle system and user signals.

In an embodiment, each driver implementation 206 and 208 provides sufficient mapping and definitional information to allow suitable cross-reference between its supported functionality and the generic driver format. Similarly, the access interface generic implementation layer 204 provides sufficient mapping and definitional information to allow suitable cross-reference between the generic driver format and the supported functionality for the corresponding access interface.

In operation, when external functionality or a non-native access interface is being used to access application logic 200, a determination is made regarding the appropriate driver that can map the external functionality or non-native access interface to the generic driver format. The actions and functionality for the immediate access is first mapped to the generic driver format, and then mapped to the specific access interface format native to the access interface for the application logic 200. For a database application, such actions or functionality could include, for example, instructions to query, update, maintain, and configure data stored at databases controlled or maintained by application logic 200. Data and functionality from the application logic 200 to the calling entity would undergo a reverse process, in which information from the application logic in the native format of the access interface implementation layer is first converted into the generic driver format, and then is mapped into the original specific format recognizable by the original calling entity.

In this manner, any additional functionality or external access interface method can be supported merely by adding a new driver that maps specific driver information into the generic driver interface format. This can be performed without any modification to the access interface implementation layer 202, access interface generic implementation layer 203, or the generic driver implementation layer 204. Any applications that seek to implement a new type of access interface can still interface with all the existing access interface methods, merely by creating a new specific interface implementation layer for the new access interface, which interacts with the existing generic interface implementation layer and existing drivers. This tremendously enhances the scalability of existing systems to interact with new access interfaces or for existing access interfaces to interact with new applications.

Figure 3:
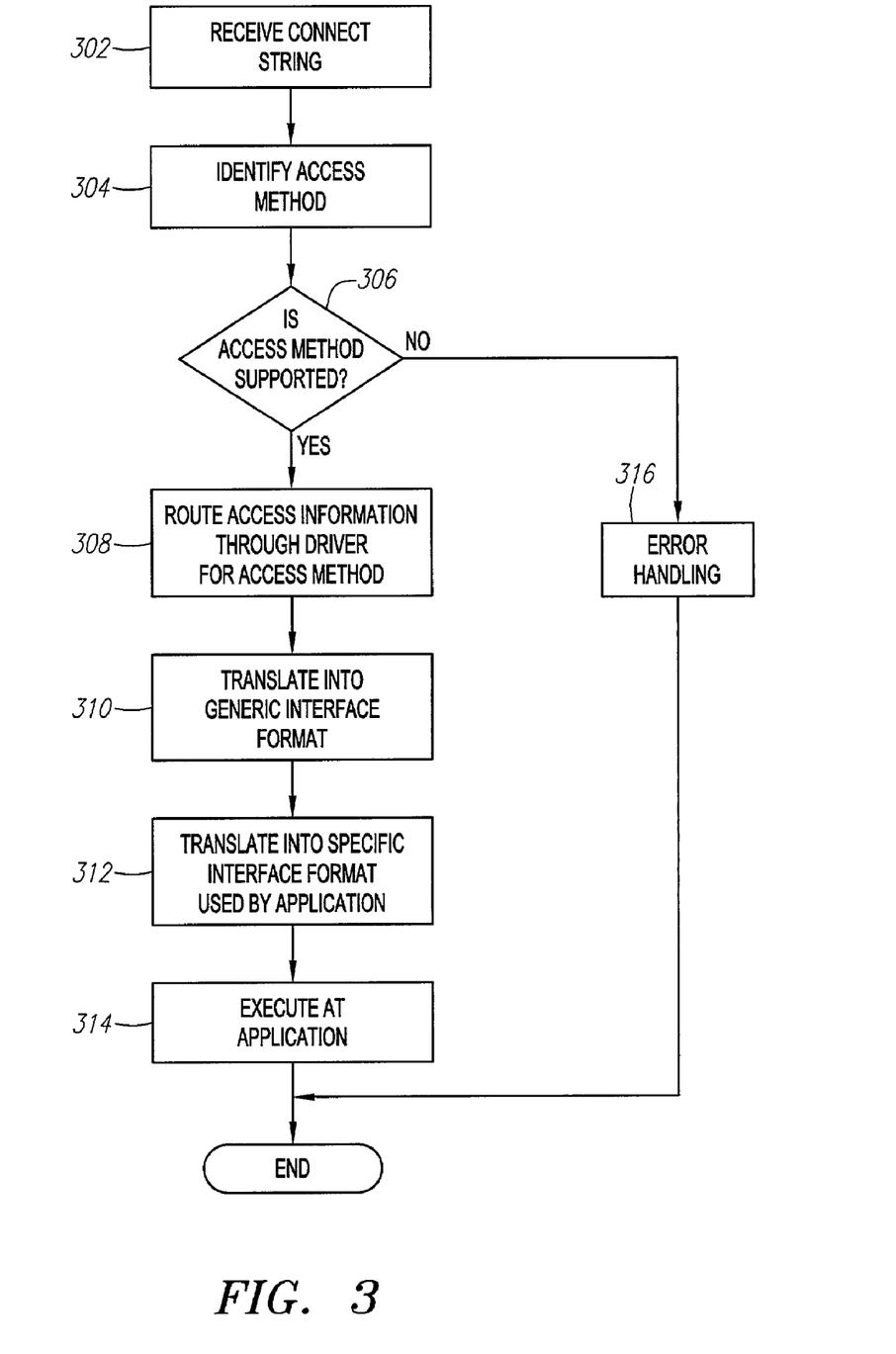
FIG. 3 is a flowchart of a process for implementing an access interface according to an embodiment of the invention.

FIG. 3 shows a flowchart of a process for implementing an embodiment of the invention. At step 302, connection information, e.g., a connect string, is received indicating a desire to access the application 200. In an embodiment, the connect string identifies the specific set of functionality or access method being used as well as the data source to be accessed. At step 304, the connect string is parsed to identify the set of functionality or access method used by the client. A determination is made whether the identified set of functionality or access method is supported by the system (step 306), e.g., whether a driver exists for the identified access method. If the identified access method is not supported, then an appropriate error handling step is performed (step 316), and the process ends.

If the identified set of functionality or access method is supported, then the access information is routed to the appropriate driver for the identified set of functionality or access method (step 308). The driver 206 converts the access information into a generic driver interface format (step 310). The access information in the generic driver interface format is thereafter converted into the specific access interface format that is directly supported by the access interface for the application logic (step 312). The application logic thereafter executes the desired functionality consistent with the access information (step 314).

In this manner, an application 200 can be configured to interact with multiple access interface methods. Unlike the approach of FIG. 1, in which the application is specially configured to directly interface with multiple supported access interface methods, the approach of FIG. 2 allows the application to be configured to directly support only a single access interface method. The multi-layered architecture 201 of FIG. 2 provides a mechanism that maps the formats of the multiple access interface methods into a generic driver format, and thereafter allows that generic driver format to be mapped to formats supported by other access interface methods. In this manner, the functionality of the application is exposed in a single access interface that can be made available in all environments for all other access interface methods.

It is noted that even in the present invention, multiple types of access interfaces can be directly supported for a computing application, by implementing a separate specific access interface implementation layer for each directly supported interface method. This approach may be desirable, for example, if the application is anticipated to receive most of its data request from a limited number of access interface methods. One or more generic interface implementation layers can be implemented to allow all other access interface methods to be converted into one or more of the directly supported formats.

One advantage provided by embodiments of the invention is that custom interfaces do not have to be maintained to allow direct access by the application for each desired interface method. Instead, only a single access interface method need be directly supported for the application. Maintainability is improved since substantial changes to the directly supported access interface only has to be made once. This is in sharp contrast to the approach of FIG. 1, in which each substantial change would likely have to be made for each interface stack that directly interfaces with the application logic.

Moreover, differences in functionality between various access interface methods can be eliminated and such functionality universally supported. For example, a trusted callback or trusted recursion is functionality that is not typically supported by all access interfaces in a database environment. Using embodiments of the invention, such functionality can be directly supported if the appropriate drivers are employed to suitably map the desired callback or recursion functionality.

The present invention can be utilized within a larger architectural context. For example, it is noted that several widely accepted APIs or call interface standards have been implemented in various computing contexts. As just one example, Open Database Connectivity (ODBC) is an application programming interface (API) for database access. This API is based on the Call-Level Interface (CLI) specifications from X/Open and ISO/IEC for database APIs and uses Structured Query Language (SQL) as its database access language.

Figure 4:
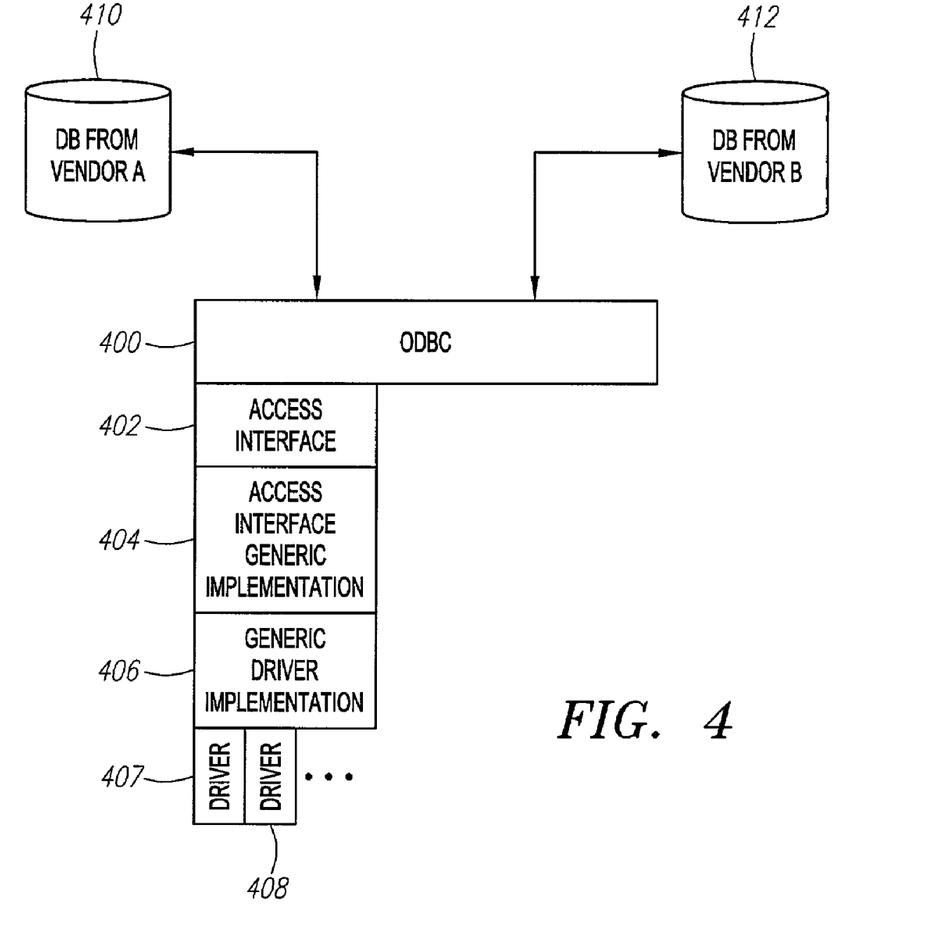
FIG. 4 shows the architecture of FIG. 2 interacting with an ODBC interface.

An embodiment of the present invention can be used to allow multiple sets of functionality or access methods to interact with a standard API such as ODBC, without having to create a different ODBC application stack for each desired access interface method. As shown in FIG. 4, the standardized ODBC API mechanism 400 may be used to access databases from multiple vendors, e.g., database 410 from a first database vendor and database 412 from a second database vendor. A single specific access interface implementation layer 402 is created/configured to interact with the ODBC API mechanism 400.

In operation, any external sets of functionality or external access interface methods that interact with ODBC have a corresponding driver 407 or 408 that would provide sufficient mappings to a generic driver interface format. A separate driver 406 can be used for each distinct set of functionality or access interface method that is anticipated to interact with the ODBC API mechanism 400. The generic driver interface implementation layer 406 maps the access information to the generic driver interface format, which is in turn mapped to the ODBC supported format via the access interface generic implementation layer 404. The access interface generic implementation layer 404 provides sufficient mappings to allow functionality supported by the ODBC access interface to be translated to/from the generic driver interface format. Once the access information is sufficiently mapped into the native ODBC supported format, the ODBC access interface implementation layer 402 can handle that access information and pass it on to the ODBC application logic layer.

In this manner, the invention can provide support for any standard API by merely adding a new specific access interface implementation layer 402 and access interface generic implementation layer 404 corresponding to the standard API which interacts with the existing generic driver interface implementation layer 406, allowing these other APIs to interact with existing drivers 407 and 408. Any new sets of functionality or new access interface methods can interact with an existing standard API merely by adding a new driver corresponding to the new access interface.

SYSTEM ARCHITECTURE OVERVIEW

Figure 5:
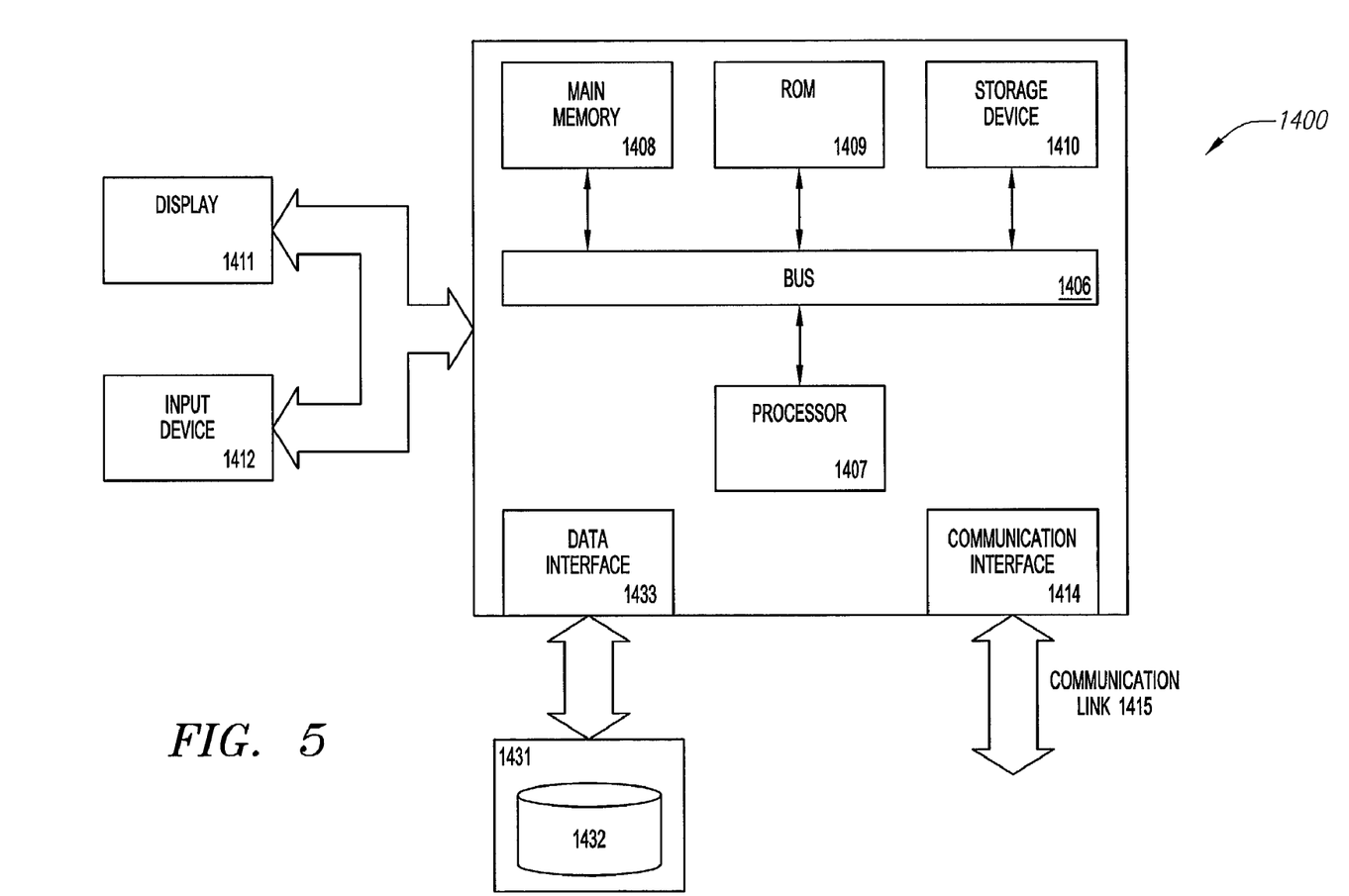
FIG. 5 is a diagram of a computer system architecture with which the present invention can be implemented.

The execution of the sequences of instructions required to practice the invention may be performed in embodiments of the invention by a computer system 1400 as shown in FIG. 5. In an embodiment of the invention, execution of the sequences of instructions required to practice the invention is performed by a single computer system 1400. According to other embodiments of the invention, two or more computer systems 1400 coupled by a communication link 1415 may perform the sequence of instructions required to practice the invention in coordination with one another. In order to avoid needlessly obscuring the invention, a description of only one computer system 1400 will be presented below; however, it should be understood that any number of computer systems 1400 may be employed to practice the invention.

A computer system 1400 according to an embodiment of the invention will now be described with reference to FIG. 5, which is a block diagram of the functional components of a computer system 1400 according to an embodiment of the invention. As used herein, the term computer system 1400 is broadly used to describe any computing device that can store and independently run one or more programs.

Each computer system 1400 may include a communication interface 1414 coupled to the bus 1406. The communication interface 1414 provides two-way communication between computer systems 1400. The communication interface 1414 of a respective computer system 1400 transmits and receives electrical, electromagnetic or optical signals, that include data streams representing various types of signal information, e.g., instructions, messages and data. A communication link 1415 links one computer system 1400 with another computer system 1400. For example, the communication link 1415 may be a LAN, in which case the communication interface 1414 may be a LAN card, or the communication link 1415 may be a PSTN, in which case the communication interface 1414 may be an integrated services digital network (ISDN) card or a modem.

A computer system 1400 may transmit and receive messages, data, and instructions, including program, i.e., application, code, through its respective communication link 1415 and communication interface 1414. Received program code may be executed by the respective processor(s) 1407 as it is received, and/or stored in the storage device 1410, or other associated non-volatile media, for later execution.

In an embodiment, the computer system 1400 operates in conjunction with a data storage system 1431, e.g., a data storage system 1431 that contains a database 1432 that is readily accessible by the computer system 1400. The computer system 1400 communicates with the data storage system 1431 through a data interface 1433. A data interface 1433, which is coupled to the bus 1406, transmits and receives electrical, electromagnetic or optical signals, that include data streams representing various types of signal information, e.g., instructions, messages and data. In embodiments of the invention, the functions of the data interface 1433 may be performed by the communication interface 1414.

Computer system 1400 includes a bus 1406 or other communication mechanism for communicating instructions, messages and data, collectively, information, and one or more processors 1407 coupled with the bus 1406 for processing information. Computer system 1400 also includes a main memory 1408, such as a random access memory (RAM) or other dynamic storage device, coupled to the bus 1406 for storing dynamic data and instructions to be executed by the processor(s) 1407. The main memory 1408 also may be used for storing temporary data, i.e., variables, or other intermediate information during execution of instructions by the processor(s) 1407.

The computer system 1400 may further include a read only memory (ROM) 1409 or other static storage device coupled to the bus 1406 for storing static data and instructions for the processor(s) 1407. A storage device 1410, such as a magnetic disk or optical disk, may also be provided and coupled to the bus 1406 for storing data and instructions for the processor(s) 1407.

A computer system 1400 may be coupled via the bus 1406 to a display device 1411, such as, but not limited to, a cathode ray tube (CRT), for displaying information to a user. An input device 1412, e.g., alphanumeric and other keys, is coupled to the bus 1406 for communicating information and command selections to the processor(s) 1407.

According to one embodiment of the invention, an individual computer system 1400 performs specific operations by their respective processor(s) 1407 executing one or more sequences of one or more instructions contained in the main memory 1408. Such instructions may be read into the main memory 1408 from another computer-usable medium, such as the ROM 1409 or the storage device 1410. Execution of the sequences of instructions contained in the main memory 1408 causes the processor(s) 1407 to perform the processes described herein. In alternative embodiments, hard-wired circuitry may be used in place of or in combination with software instructions to implement the invention. Thus, embodiments of the invention are not limited to any specific combination of hardware circuitry and/or software.

The term "computer-usable medium," as used herein, refers to any medium that provides information or is usable by the processor(s) 1407. Such a medium may take many forms, including, but not limited to, non-volatile, volatile and transmission media. Non-volatile media, i.e., media that can retain information in the absence of power, includes the ROM 1409, CD ROM, magnetic tape, and magnetic discs. Volatile media, i.e., media that can not retain information in the absence of power, includes the main memory 1408. Transmission media includes coaxial cables, copper wire and fiber optics, including the wires that comprise the bus 1406. Transmission media can also take the form of carrier waves; i.e., electromagnetic waves that can be modulated, as in frequency, amplitude or phase, to transmit information signals. Additionally, transmission media can take the form of acoustic or light waves, such as those generated during radio wave and infrared data communications.

In the foregoing specification, the invention has been described with reference to specific embodiments thereof. It will, however, be evident that various modifications and changes may be made thereto without departing from the broader spirit and scope of the invention. For example, the reader is to understand that the specific ordering and combination of process actions shown in the process flow diagrams described herein is merely illustrative, and the invention can be performed using different or additional process actions, or a different combination or ordering of process actions. The specification and drawings are, accordingly, to be regarded in an illustrative rather than restrictive sense.

The invention claimed is:

1. A computer-implemented method for an access interface, the method comprising:
    a) receiving a connection request for an application, the application corresponding to a direct access interface format;
    b) identifying one of a plurality of specific access interface methods for the connection request, the one specific access interface method corresponding to a specific access interface format from a plurality of supported access interface formats;
    c) mapping access information for the connection request from the specific access interface format to a generic access interface format;
    d) mapping the access information from the generic access interface format to the direct access interface format; and
    e) executing functionality associated with the access information at the application.

2. The computer-implemented method of claim 1 in which the connection request contains an identification of the specific access interface method.

3. The computer-implemented method of claim 1 in which a driver performs the act of mapping the access information for the connection request from the specific access interface format to a generic access interface format.

4. The computer-implemented method of claim 3 in which a separate driver exists for each one of the plurality of specific access interface methods.

5. The computer-implemented method of claim 1 in which the application comprises a database application.

6. The computer-implemented method of claim 5 in which the access information comprises a database query.

7. The computer-implemented method of claim 1 in which the application corresponds to one direct access interface format.

8. The computer-implemented method of claim 1 in which the direct access interface format comprises ODBC.

9. The computer-implemented method of claim 1 in which the access information implements trusted recursive access to the application kernel.

10. The computer-implemented method of claim 1 in which the generic access interface format is independent of the direct access interface format.

11. A computer program product comprising a tangible computer usable medium having executable code to execute a method for implementing an access interface, the method comprising:
    a) receiving a connection request for an application, the application corresponding to a direct access interface format;
    b) identifying one of a plurality of specific access interface methods for the connection request, the one specific access interface method corresponding to a specific access interface format from a plurality of supported access interface formats;

c) mapping access information for the connection request from the specific access interface format to a generic access interface format;

d) mapping the access information from the generic access interface format to the direct access interface format; and e) executing functionality associated with the access information at the application.

12. The computer program product of claim 11 in which the connection request contains an identification of the specific access interface method.

13. The computer program product of claim 11 in which a driver performs the act of converting the access information for the connection request from the specific access interface format to a generic access interface format.

14. The computer program product of claim 13 in which a separate driver exists for each one of the plurality of specific access interface methods.

15. The computer program product of claim 11 in which the application comprises a database application.

16. The computer program product of claim 15 in which the access information comprises a database query.

17. The computer program product of claim 11 in which the application corresponds to one direct access interface format.

18. The computer program product of claim 11 in which the direct access interface format comprises ODBC.

19. The computer program product of claim 11 in which the access information implements trusted recursive access to the application kernel.

20. The computer program product of claim 11 in which the generic access interface format is independent of the direct access interface format.

21. A system for computer-implemented access interface for a computer application, the computer application coded to directly interact with a first access interface format, comprising:

a first component layer that interfaces the computer application with the first access interface format;

a second component layer that operates upon a generic access interface format, the second component layer functionally interfacing the generic access interface format to the first access interface format; and a third component layer that translates between a specific access interface format and the generic access interface format, the third component layer adapted to include a plurality of specific access interface formats.

22. The system of claim 21 in which the third component layer is specially configured for each of the plurality of specific access interface formats.

23. The system of claim 21 in which the computer application comprises a database application.

24. The system of claim 23 in which the second component layer comprises data structures to implement database functionality.

25. The system of claim 24 in which the data structures correspond to at least one of a database query, database maintenance, or bind information.

26. The system of claim 21 in which the computer application directly corresponds to one access interface format.

27. The system of claim 21 in which the first access interface format comprises ODBC.

28. The system of claim 21 in which the generic access interface format is independent of the first access interface format.

* * * * *